United States Patent Office 2,907,218
Patented Oct. 6, 1959

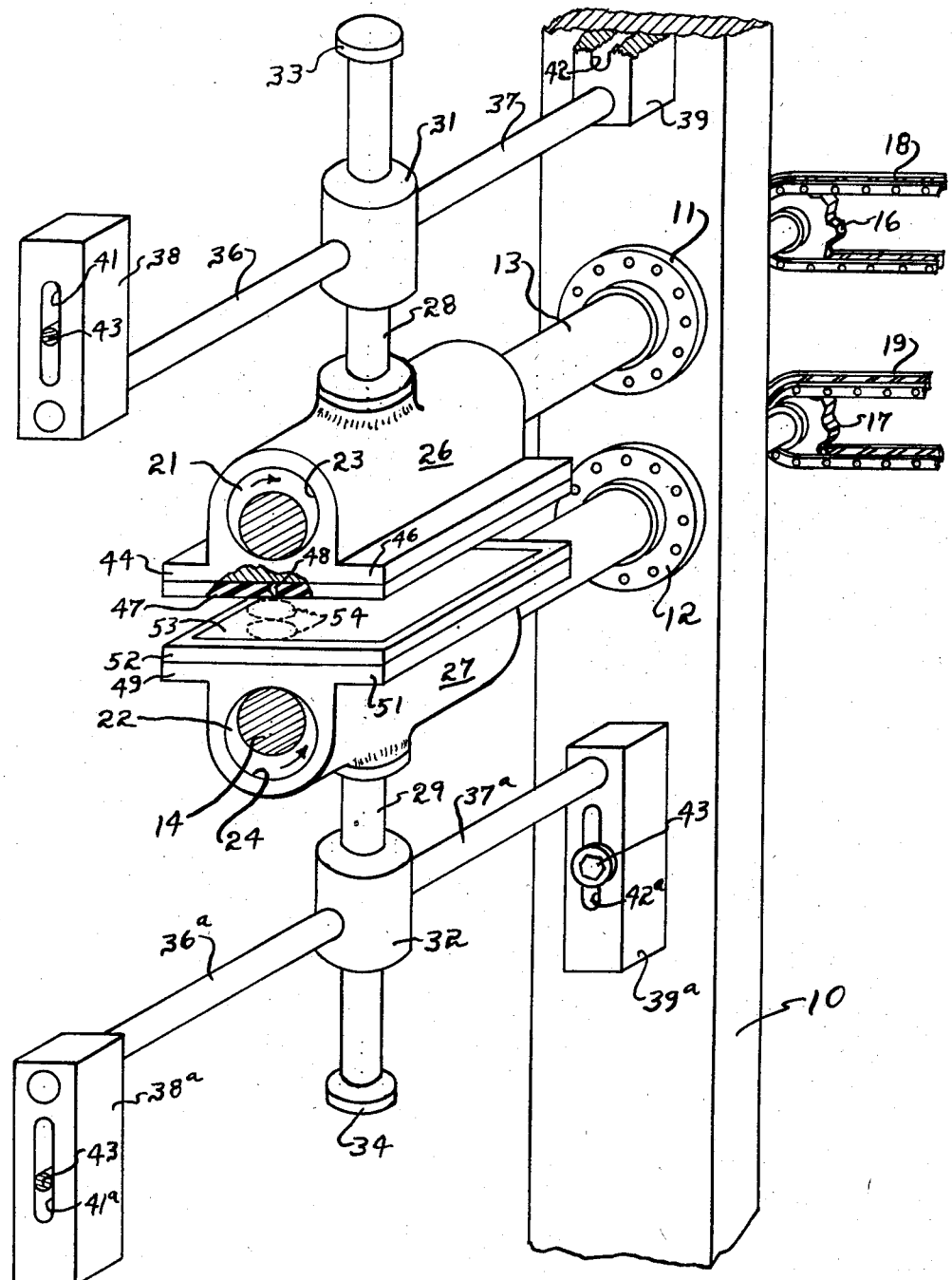

2,907,218
APPARATUS FOR CONTROLLING THE PATH OF MOVEMENT OF AN OBJECT ABOUT AN ECCENTRIC

Norbert A. R. Chabannes, Tuscaloosa, Ala.

Application September 5, 1957, Serial No. 682,168

7 Claims. (Cl. 74—49)

This invention relates to apparatus for controlling the path of movement of an object about an eccentric to which a shaft is keyed and more particularly to apparatus for controlling the path of movement of a pair of reciprocating heads which are adapted to move toward and away from each other about eccentrics.

Another object of my invention is to provide improved means for controlling the path of movement of a pair of reciprocating heads whereby the heads are adapted to move in both circular and elliptical paths.

Another object of my invention is to provide apparatus of the character designated which shall be particularly adapted for use as cutting, stamping, sheet forming, printing and intermittent feeder apparatus.

A still further object of my invention is to provide apparatus of the character designated which shall be simple of construction, economical of manufacture and which shall be adapted for adjustment whereby the adjacent heads impart a gradual slicing or cutting action relative to each other, thus greatly reducing the power required to actuate the apparatus.

Apparatus embodying features of my invention is illustrated in the accompanying drawing forming a part of this application in which I show a perspective view, partly broken away and in section, showing a pair of cutter heads mounted in accordance with my invention.

Referring now to the drawing for a better understanding of my invention, I show a supporting frame 10 having suitable bearings 11 and 12 mounted therein for supporting parallel shafts 13 and 14, respectively. Mounted adjacent the outer ends of the shafts 13 and 14 are sprockets 16 and 17 which are driven by sprocket chains 18 and 19, respectively. The sprocket chains 18 and 19 are connected to a suitable source of power, not shown.

Keyed eccentrically to the shafts 13 and 14 inwardly of the frame 10 are eccentric members 21 and 22. The shafts 13 and 14 extend through suitable openings 23 and 24 provided in upper and lower heads 26 and 27, respectively. As shown in the drawings, the openings 23 and 24 are of a size to receive the eccentric members 21 and 22 whereby upon rotation of the shafts 13 and 14 reciprocatory motion is imparted to the heads 26 and 27. The shafts 13 and 14 and the eccentrics 21 and 22 travel in the direction of the arrows whereby the heads 26 and 27 move in elliptical or circular paths relative to each other, depending upon the position of the control means to be described hereinafter.

Secured to the outer portion of the heads 26 and 27 and extending outwardly in opposite directions substantially normal to the shafts 13 and 14 are elongated actuating members 28 and 29 which preferably are in the form of rod-like members. Mounted for sliding movement on the actuating members 28 and 29 are control members 31 and 32 which may be in the form of suitable bearing blocks. Stop members 33 and 34 are mounted at the free ends of the actuating members 28 and 29, as shown. Connected to the control member 31 and projecting outwardly from opposite sides thereof are arms 36 and 37 having brackets 38 and 39 pivotally connected adjacent the outer ends thereof, as shown. Elongated slots 41 and 42 which extend substantially parallel to the actuating member 28 are provided in the brackets 38 and 39 for receiving a bolt 43 which is attached to the frame 10.

In like manner, secured to the control member 32 are outwardly extending arms 36a and 37a having brackets 38a and 39a pivotally connected to the outer ends thereof. Elongated slots 41a and 42a which extend substantially parallel to the actuating member 29 are provided in the brackets 38a and 39a for receiving the bolts 43. By providing the slot and bolt connection between the brackets 38, 39, 38a and 39a and the frame 10, the position of the brackets may be readily adjusted whereby the control members 31 and 32 may be moved to selected positions along the actuating members 28 and 29.

In the drawing, I show my apparatus adapted for use in cutting blanks from sheet material, such as cardboard. The head 26 is provided with outwardly extending flanges 44 and 46 adjacent the bottom thereof to provide a relatively flat undersurface for the head. Mounted on the undersurface of the head 26 is a resilient sheet of material 47 which may be in the form of rubber or the like. Secured to the head 26 and projecting downwardly through the resilient material 47 is a knife or cutter member 48 which preferably terminates adjacent the lower edge of the resilient material 47 whereby the resilient material forces the sheet of material being cut away from the knife after the cutting action. That is, the sheet of resilient material 47 is compressed as the knife 48 passes through the material being cut. Accordingly, as the heads 26 and 27 move outwardly away from each other, the sheet of material 47 resumes its original shape thus forcing the cut material downwardly away from the knife 48.

The lower head 27 is provided with outturned flanges 49 and 51 which form with the upper portion of the head 27 a relatively flat surface. Mounted on this flat upper surface of the head 27 is a sheet of resilient material 52 which in turn has a sheet of spring steel material 53 mounted thereon.

From the foregoing description, the operation of my improved apparatus will be readily understood. The sheet of material to be cut, stamped, or intermittently fed between the heads 26 and 27 is introduced between the heads 26 and 27 whereby the sheet of material passes toward the left as viewed in the drawing. The sheet of material may be supplied to the heads 26 and 27 by any suitable means, such as feed rollers or the like, not shown. As the eccentrics 21 and 22 are rotated by the shafts 13 and 14, the knife 48 and the subjacent point on the lower head 27 assume elliptical paths, as shown in dotted lines at 54 whereby the knife 48 moves at an angle to the sheet of material being cut rather than moving in a direction perpendicular to the sheet, thus causing a slicing or gradual cut of the sheet of material. By providing the gradual or slicing cut of the material, there is no sudden engagement of the knife with the sheet of material thus providing for smooth operation of the apparatus and assuring an even and accurate cut. In like manner, where the apparatus is employed to stamp, form or print, the path of movement of the heads 26 and 27 may be adjusted whereby the desired result is obtained.

To change the path of movement of the heads 26 and 27, the control members 31 and 32 are moved toward and away from the heads 26 and 27 by loosening the bolts 43 and then securing the brackets 38, 39, 38a and 39a in the adjusted position. As the control members 31 and 32 are moved closer to their associated heads, the flatter will be the elliptical path made by the heads. On the other hand, as the control members 31 and 32 are moved outwardly away from the heads 26 and 27, respectively, the elliptical paths of the heads become rounder. That is to say, the control members 31 and 32 form pivot points for the actuating members 28 and 29 and the position of these pivot points determines the path of movement of the heads 26 and 27 about the eccentrics. Accordingly, as this pivot point, determined by the position of the control members 31 and 32, moves closer to the eccentrics, the elliptical path made by the heads 26 and 27 becomes progressively flatter. On the other hand, as these pivot points are moved further away from the eccentrics, the elliptical paths made by the heads 26 and 27 become progressively rounder.

From the foregoing description, it will be seen that I have devised an improved apparatus for controlling the path of movement of an object about an eccentric. By adjusting the position of the control members 31 and 32 relative to their associated eccentrics, the paths of movement of the heads may be varied to impart the desired elliptical path of movement of the tool carried by the heads. Also, the path of movement of one head may be adjusted whereby it is different from the path of movement of the other head, if desired. In actual practice, I have found that my apparatus is satisfactory in every respect for cutting sheet material, such as cardboard or the like. My apparatus is also adapted for stamping, forming or printing and may be employed as an intermittent feeder and stamper whereby a continuous sheet of material may be continuously fed through the apparatus and stamped in a controlled manner. By adjusting the pivot points of the control members 31 and 32, the linear speed of the heads 26 and 27 relative to each other may be changed from a constant speed to a differential speed. That is, the surface speed of the path of travel of the head is varied by the angular travel thereof which in turn is determined by the position of the control members 31 and 32. The eccentrics thus introduce the circular or rotary motion whereas the location of the control members 31 and 32 control the linear speed of the resulting motion and also the shape of that motion.

While I have shown my invention in but one form it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. In apparatus for controlling the path of movement of an object about an eccentric through which a shaft is keyed eccentrically, an elongated actuating member connected to said object and extending substantially normal to said shaft, a bearing member mounted for sliding movement on said actuating member, at least one outwardly extending arm mounted on said bearing member, a bracket mounted adjacent the outer end of said arm, and a bolt and slot connection between said bracket and a stationary supporting member whereby said bracket is adapted for adjustment toward and away from the eccentric.

2. In apparatus for controlling the paths of movement of a pair of reciprocating heads adapted to move toward and away from each other, there being openings through said heads, eccentrics mounted for rotation in said openings, shafts extending substantially parallel to each other and keyed eccentrically to said eccentrics, actuating members connected to said heads and extending outwardly in opposite directions substantially normal to said shafts, and control members operatively connected to and adjustable along said actuating members whereby the distance between said control members and said eccentrics can be varied to change the paths of movement of said heads.

3. In apparatus for controlling the path of movement of a pair of reciprocating heads adapted to move toward and away from each other, there being openings through said heads, eccentrics mounted for rotation within said openings, shafts extending substantially parallel to each other and keyed eccentrically to said eccentrics, elongated actuating members connected to said heads and extending outwardly in opposite directions substantially normal to said shafts, bearing members mounted for sliding movement on said actuating members, and means holding said bearing members in selected positions along said actuating members whereby the distance between said bearing members and said eccentrics can be varied to change the paths of movement of said heads.

4. In apparatus for controlling the path of movement of a pair of reciprocating heads adapted to move toward and away from each other, there being openings through said heads, eccentrics mounted for rotation within said openings, shafts extending substantially parallel to each other and keyed eccentrically to said eccentrics, a supporting frame, bearings in said frame supporting said shafts, means propelling said shafts in unison, elongated actuating members connected to said heads and extending outwardly in opposite directions substantially normal to said shafts, bearing members mounted for sliding movement on said actuating members, and means holding said bearing members in selected positions along said actuating members whereby the distance between said bearing members and said eccentrics is adjustable to vary the paths of movement of said heads.

5. Apparatus as defined in claim 4 in which the means holding the bearing members in selected positions comprises at least one outwardly extending arm mounted on said bearing member, a bracket mounted adjacent the outer end of said arm, and a bolt and slot connection between said bracket and the supporting frame whereby, the bracket is adapted for adjustment toward and away from the eccentrics.

6. In apparatus for controlling the path of movement of a reciprocating head mounted on an eccentric through which a shaft is keyed eccentrically, a substantially vertical actuating member connected to the head and extending outwardly from the head in a direction substantially normal to the axis of the shaft, a control member operatively connected to and adjustable along said actuating member whereby the distance between the control member and the eccentric may be varied to change the path of movement of the head, and said control member being mounted for pivotal movement in a vertical plane substantially perpendicular to the axis of the shaft whereby the head may be moved laterally to permit the head to assume an elliptical path of movement.

7. In apparatus for controlling the path of movement of a reciprocating head, there being an opening extending through said head, an eccentric mounted for rotation in the opening, a shaft extending horizontally and keyed eccentrically to the eccentric, a substantially vertical actuating member connected to the head and extending outwardly from the head in a direction substantially normal to the axis of the shaft, a control member operatively connected to and adjustable along said actuating member whereby the distance between the control member and the eccentric may be varied to change the path of movement of the head, and said control member being mounted for pivotal movement in a vertical plane substantially perpendicular to the axis of the shaft whereby the head may be moved laterally to permit the head to assume an elliptical path of movement.

References Cited in the file of this patent

UNITED STATES PATENTS

| | | |
|---|---|---|
| 2,104,764 | Sanders et al. | Jan. 11, 1938 |
| 2,792,062 | Pierce | May 14, 1957 |